Aug. 9, 1949.   R. H. VON LIEDTKE   2,478,439
METHOD OF IMPREGNATING FIBROUS ARTICLES
Filed Sept. 4, 1945   3 Sheets-Sheet 1
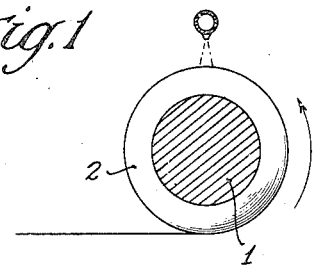
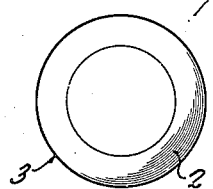
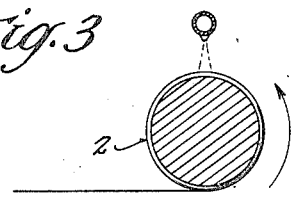
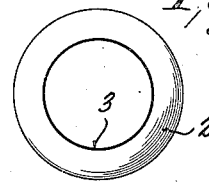
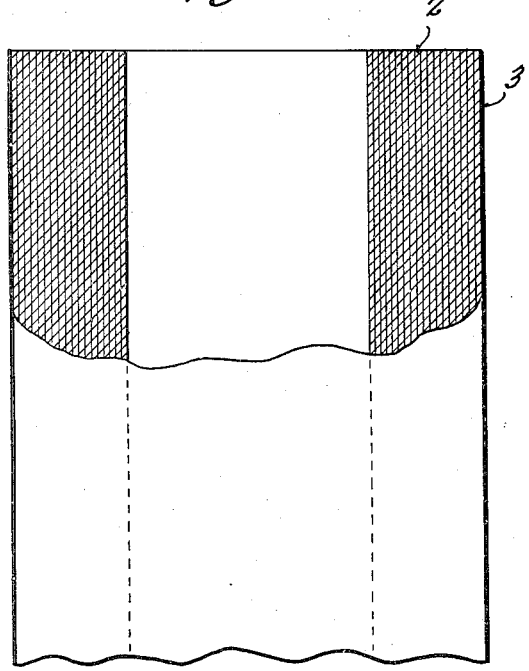
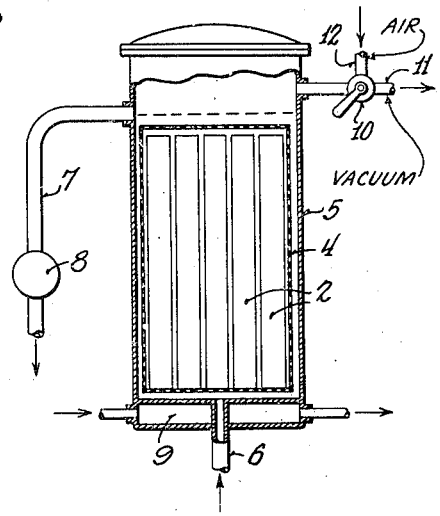
INVENTOR.
RUDOLPH H. VON LIEDTKE
BY
ATTORNEY.

INVENTOR.
RUDOLPH H. VON LIEDTKE
BY
ATTORNEY.

INVENTOR.
RUDOLPH H. VON LIEDTKE
BY
ATTORNEY.

Patented Aug. 9, 1949

2,478,439

UNITED STATES PATENT OFFICE 2,478,439

METHOD OF IMPREGNATING FIBROUS ARTICLES

Rudolph H. von Liedtke, Chicago, Ill., assignor, by mesne assignments, to Line Material Company, South Milwaukee, Wis., a corporation of Delaware Application September 4, 1945, Serial No. 614,354

2 Claims. (Cl. 117—65)

This invention relates to an impregnated article and to the method of impregnation.

This invention is applicable to a great number of different articles such as conduits formed of paper pulp or other fiber pipe which may be used in place of metallic pipe, as electrical conduits, sewer pipe, water pipe, or air pipe, or which may be formed as special fittings of various shapes, which may be formed as caps, bells, bends, plugs, or which may be formed in flat slab-like sections. However, for the sake of simplicity, this invention will be described as primarily directed to tubes such as conduits formed of paper pulp though it is to be distinctly understood that the invention is not limited to this particular shape or type of article or to the process of making such particular type or shape of article.

In manufacturing conduits of wound paper pulp, the process heretofore employed has been to wind the paper pulp in sheets to form the tube and thereafter to dry the tube and impregnate it with pitch to render the tube non-absorbent and waterproof and to more or less bind the successive layers together. In the prior process, the dried tubes were placed in a vat of pitch and vacuum was produced so as to tend to draw most of the air from the interstices of the tube wall. Thereafter the vacuum was relieved and the pitch flowed partly into the wall of the tube. It was found, however, that when the vacuum was produced that the air was drawn radially inwardly and radially outwardly from the wall of the tube and consequently when the vacuum was relieved the remaining entrapped air, though it was under a much reduced pressure during the application of the vacuum, nevertheless did collect intermediate the inner and outer surfaces of the wall of the tube, usually approximately centrally between the inner and outer surface of the wall of the tube. The consequence of this is that the flow of pitch did not take place uniformly throughout but the pitch flowed into the wall of the tube from both the inner and outer surfaces of the tube wall simultaneously and the entrapped air, located approximately centrally between these inner and outer surfaces, prevented the pitch from fully permeating or penetrating the entire wall of the tube. When tubes produced in accordance with this usual practice were cut into sections, a very much lighter colored portion of the tube was visible at about the center portion between the inner and outer surfaces showing that the pitch had not penetrated this portion of the tube. The consequence of this is that the tube is very much weakened and also does not have the non-absorbent, waterproof pitch all the way through the body of the wall of the tube. In addition to these defects in the prior processes, it frequently happened that during the winding of the paper pulp on the mandrel, air pockets or blisters were formed between the inner face of the oncoming sheet of paper pulp and the adjacent partially wound tube. With the prior processes of impregnating, these blisters or voids remained in the finished impregnated tube with consequent weakening of the tube mechanically and also with regard to its dielectric properties and coefficients.

This invention is designed to overcome the defects hereinabove set forth and other defects inherent in the previously known processes and objects of this invention are to provide a method of impregnation and an impregnated article in which the method results in an article which is compact throughout and free from voids and is uniformly impregnated with pitch or other suitable non-absorbent, waterproof, binding material, with the binding material permeating the entire wall or body portion of the tube or other article throughout its entire extent thus vastly increasing both its mechanical strength and its dielectric properties and coefficients and so producing an article free from blisters or voids in its body portion.

In greater detail further objects of this invention are to provide a method of impregnating whereby substantially all of the air is drawn from the interstices in the wall of the article during the time the vacuum is effective and in which, when the vacuum is relieved, the pitch penetrates substantially uniformly throughout the entire wall of the article producing a dense, compact, waterproof article having both high mechanical strength and high dielectric properties and coefficients and being free from voids.

Further objects are to provide a method of impregnating an article in which a temporary coating or temporary seal is formed adjacent one surface of the article, either the inner or outer surface, in which this seal may be formed substantially wholly exterior of the wall of the article or may partly impregnate the wall of the article at its inner or outer surface, in which the temporary coating acts as a protecting seal resisting the effect of the heated pitch for a certain length of time and for a certain range of temperature and which, therefore, allows the entrapped air to be drawn from the interstices of the wall of the article substantially solely from the side opposite that which has the sealing coating applied thereon so that substantially all of the entrapped air is removed in substantially one direction from the interstices of the wall of the article, the process being so arranged that when the vacuum is relieved the pitch flows inwardly substantially in one direction from the unsealed surface of the article towards and substantially to the sealed surface of the article, the process being arranged to thereafter allow the disintegration, breaking down, crystallizing or other destruction of the seal upon rise of temperature of the pitch and after a certain interval of time so that the seal no longer prevents entrance of pitch at the previously sealed surface but now allows the pitch to freely enter or circulate in the wall of the article from the previously sealed side.

Embodiments of the invention and various steps in the process are shown in the accompanying drawings, in which—

Figure 1 is a view showing the tube being completed with a last few convolutions being sprayed with the sealing coating.

Figure 2 shows the tube as it appears after it has been completely wound with the sealing coating on the outer side thereof.

Figure 3 is a view corresponding to Figure 1 showing the manner in which the inner convolutions of the tube are sprayed with the sealing coating.

Figure 4 shows the appearance of the tube after it has been completely wound as indicated in Figure 3.

Figure 5 is a side elevation partly broken away of the tube shown in Figure 2.

Figure 6 is a view showing the manner in which the tubes are positioned within a tank for impregnation with pitch.

Figure 7:
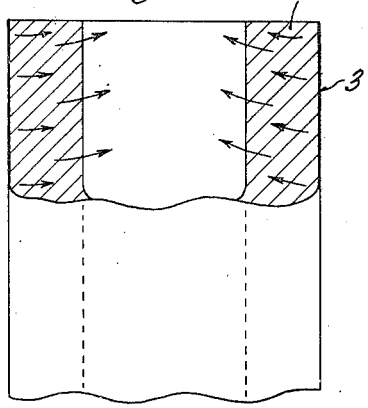
Figure 7 shows the manner in which the air flows from the interstices of the tube when subjected to vacuum.
Figure 10:
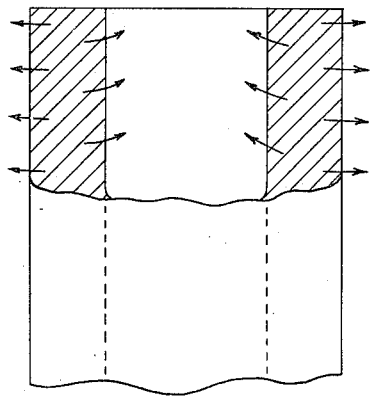
Figure 8:
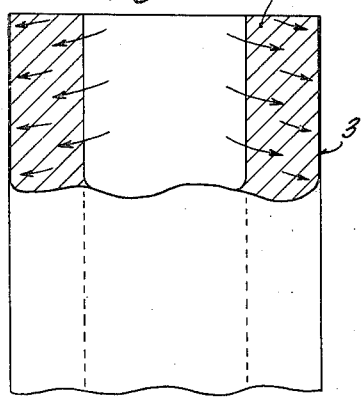
Figure 8 shows the manner in which the pitch flows into the body of the tube wall when the vacuum is relieved.
Figure 11:
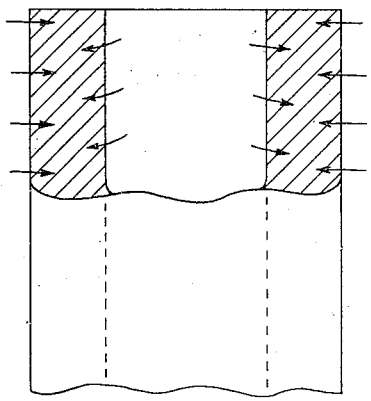
Figure 9:
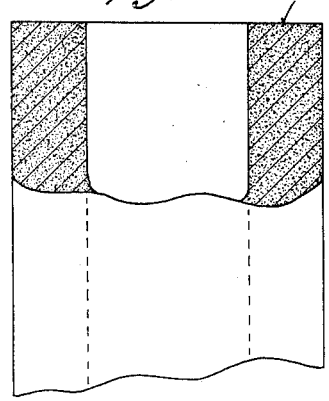
Figure 9 is a fragmentary view of the upper end of the finished impregnated tube.
Figure 12:
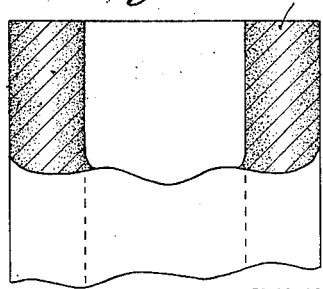

Figures 10, 11, and 12 are views corresponding respectively to Figures 7, 8, and 9 showing the corresponding steps in the process previously followed.

Figure 13:
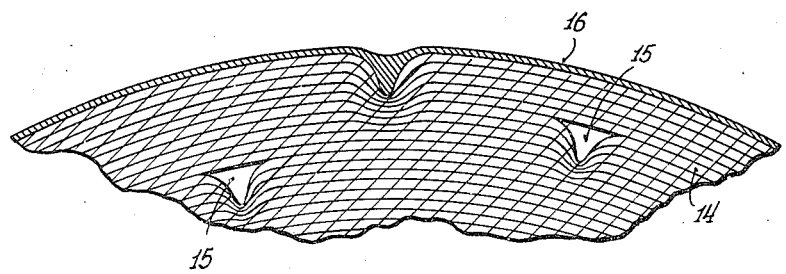

Figure 13 is an enlarged fragmentary transverse sectional view through a different type of tube showing the sealing coating in position.

Figure 14:
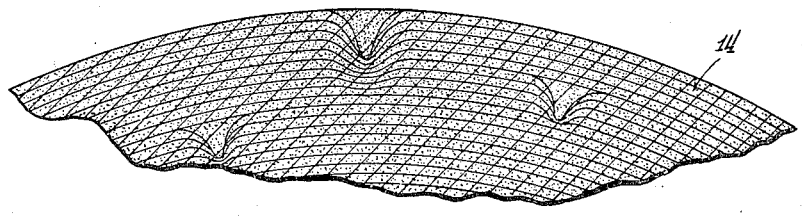

Figure 14 is a sectional view corresponding to Figure 13, such section being taken through the finished tube.

Figure 15:
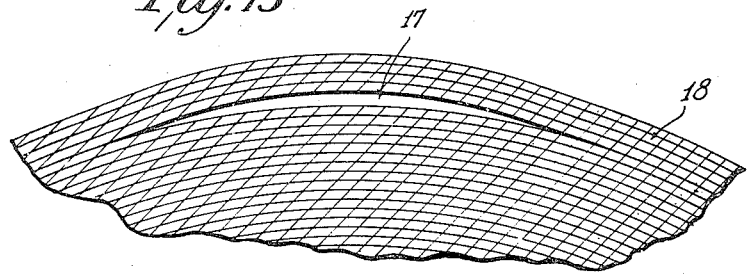

Figure 15 is a sectional view showing one of many voids that are formed in the tube during the winding operation.

Figure 16:
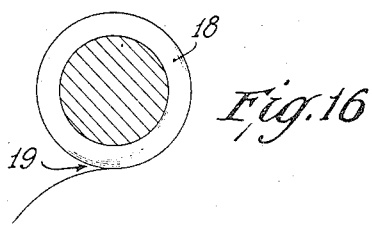

Figure 16 is an end view showing the mandrel in section and showing the paper pulp being wound on the mandrel.

In practicing the process forming the subject matter of this invention, the tube 2 is formed by winding paper pulp on a rotating mandrel 1 in the usual manner and, in one form of the invention, spraying a sealing coating on the last few outer convolutions of the tube as indicated in Figure 1 while the last few convolutions of the paper pulp are being wound in place. The wound and coated tube is shown in Figure 2.

In another form that the invention may take, the sealing coating is sprayed on the first few convolutions of the paper pulp as indicated in Figure 3. The finished interiorly coated tube is shown in Figure 4. Figure 5 is a fragmentary side elevation partly in section showing the tube illustrated in Figure 2. It is to be understood that the paper pulp layers are not nearly as thick as indicated in Figure 5 but such thickness has been shown in Figure 5 for the sake of clearness.

The sealing coating may be a solution of silicate of soda, rosin compound, casein, etc., or may be any other suitable size which has the characteristics of sealing the outer or inner surface of the tube wall temporarily and being designed and adapted to disintegrate, disappear, or become porous when subjected to the heated pitch for a predetermined length of time and for a predetermined range of temperature. For instance, it has been found that between 125 degrees and 320 degrees Fahrenheit the silicate of soda sealing coating will break down and lose its sealing characteristics. These temperatures are merely given as illustrations and are not in any sense to be understood as limiting.

After the tube has been completely wound and coated either on its inner or its outer side it is removed from the mandrel and is thoroughly dried.

At this point it is to be understood that the coating may be applied after the tube is dried if so desired or the coating may be applied by dipping the tube or by painting a suitable size on the tube or it may be applied by dusting the material on the tube or in any other suitable manner.

The tube is indicated by the reference character 2, and in the form shown in Figure 2 is provided with a sealing coating 3 on its outer side and in the form shown in Figure 4 is provided with a sealing coating 3 on its inner side. Subsequent steps in the process are the same whether the tube is coated on its inner or outer side. Assume, for instance, that the tube shown in Figures 2 and 5 is taken for the purpose of illustration. A number of these thoroughly dried coated tubes 2 are placed in an open-work cage or container 4 and are placed within a sealed tank 5 and supplied with heated pitch or other suitable waterproof, binding, impregnating material. The heated pitch flows through the inlet pipe 6 into the lower portion of the tank or vessel 5 and flows from the upper portion of the tank 5 through the discharge pipe 7, a suitable pump or other means 8 being provided for circulating the heated pitch. The lower portion of the tank is provided with a steam jacket 9 having inlet and outlet steam pipes. A three-way valve 10 is provided for connecting the tank selectively with vacuum producing means by way of a vacuum pipe 11, or with a pipe 12 opening freely to the outside air or to air under pressure above atmospheric pressure if desired.

After the cage 4 having the tubes 2 therein is lowered into the tank 5, the tank is hermetically sealed and the heated pitch is caused to flow as indicated. The three-way valve 10 is immediately set to connect the tank with the vacuum pipe 11 and thus produce a vacuum within the tank. This causes a very marked lowering of the temperature of the pitch. The vacuum draws the air from the interstices of the wall of the tube in one direction only through the untreated or unsealed wall of the tube and in a direction away from the sealed wall of the tube. This state of affairs is indicated in Figure 7 and it will be seen that the flow of air is radially inwardly of the wall of the tube. In the old process as shown in Figure 10, the tubes had no sealing coating on either their inner or outer surfaces, and therefore the air was drawn radially inwardly and radially outwardly as indicated in Figure 10.

Contrasting the present process with the old process it will be seen that the air flows in one direction only in the present process, that is to say, radially inwardly only as shown in Figure 7 for a tube having a sealing coating on its outer side. Obviously if the sealing coating had been applied on the inner side of the tube the air from the interstices of the tube wall would flow radially outwardly only.

After the vacuum has remained for a predetermined length of time depending on the thickness of the tube wall and other factors, the vacuum is relieved and air under atmospheric pressure or air under pressure above atmospheric is admitted by properly setting the three-way valve 10. The pitch is forced into the wall of the tube and flows radially outwardly from the untreated inner surface of the wall of the tube radially towards and to the sealed outer wall of the tube as shown in Figure 8. In the old process the corresponding operation is indicated in Figure 11 and from such figure it will be seen that in the old process the pitch flows both radially inwardly and radially outwardly into the wall of the tube.

When the vacuum is relieved and pressure again builds up within the tank the temperature of the pitch rises and reaches a temperature range which causes the disappearance or disintegration of the sealing coating 3 thus allowing the free circulation of pitch at the outer surface of the now impregnated tube. The tube resulting from the new process is indicated in Figure 9 and it will be seen that the protecting coating has now become ineffective or has disappeared and if it had remained has become thoroughly porous. The tube it will be seen is impregnated substantially uniformly throughout its entire wall structure with a uniform dense body of pitch.

Figure 12 shows a tube treated as in the old process, the steps of which have been described in connection with Figures 10 and 11. It will be understood that although vacuum is produced in the impregnating tank that nevertheless there is a certain amount of highly rarefied air remaining in the interstices of the wall of the tube as the air flows both radially inwardly and radially outwardly. As shown in Figure 11 when the vacuum is relieved this rarefied air is again compressed to atmospheric pressure between two walls of inwardly flowing pitch and consequently collects approximately centrally between the inner and the outer surfaces of the tube wall as indicated by the reference character 13 in Figure 12. As a result of this, there is a shell-like or cylindrically-shaped pocket of air trapped between the inwardly and outwardly flowing pitch which prevents the pitch from permeating the entire tube wall. Instead the unpermeated portion indicated by the reference character 13 is easily visible when a section is cut from a tube impregnated in accordance with the previously known process.

As sharply contrasted with this, the present process insures the uniform impregnation of the tube wall without any trapping of air. For instance, as shown in Figure 8 when the vacuum is relieved the pitch flows radially outwardly from the inner untreated surface towards the outer treated surface. If there is any trapped, rarefied air that is carried ahead of the radially outwardly flowing pitch it will be positioned immediately adjacent the outer sealing coating 3. However, as the temperature of the pitch rises this coating disintegrates or disappears and thus any trapped air is free to escape and the pitch surrounding the outer surface of the tube is free to circulate through the outer layers of the tube. Thus there is no portion whatsoever of the tube wall in which air can be trapped and which would prevent the pitch from permeating uniformly and completely through the entire wall structure of the tube. This process, therefore, causes the layers to be firmly bound together and uniformly impregnated with a waterproof, binding pitch.

No thought is required on the part of the operator in the removal of the sealing coating as this sizing or sealing coating is automatically removed as the temperature of the pitch rises when the vacuum is relieved.

If desired, the tube may be formed as shown in Figure 13. A fragment of such a tube is indicated by the reference character 14. It differs from the previously described wound paper pulp tube in that what in effect constitutes stitching has taken place. This may be accomplished by means of a roller provided with a multitude of closely spaced stitching fingers or projecting pins which press through or enter successive layers of the tube as indicated by the reference character 15 in Figure 13 and cause small portions of successive layers to pass through or enter preceding layers. The stitched tube is coated with a sealing coating or size as previously described. Such coating is indicated by the reference character 16 in Figure 13. The sealing coating extends completely around the outer surface of the tube or around the inner surface of the tube and enters any indentations that may exist on the surface of the tube due to the stitching hereinabove described.

The stitching may be accomplished by following the method disclosed in the copending application for tube and method of making the same, Serial No. 614,355, filed September 4, 1945 by Rudolph H. von Liedtke.

The tube after having been coated with a sealing coating as hereinabove described is treated in exactly the same manner as the unstitched tube hereinbefore described. The impregnated tube is shown in Figure 14 and it will be seen that the pitch has uniformly impregnated all portions of the tube even including the small depressions formed by the stitching and that a uniform impregnation of the tube wall is thus insured as in the previously described form of the unstitched tube.

This invention accomplishes still other desirable results. It produces a tube which is impregnated uniformly throughout and which is devoid of voids or undesirable cavities which are quite often formed as a result of the winding of the paper pulp. One of the voids is indicated by the reference character 17 in the tube 18 shown in Figure 15. This void is produced by air pockets formed by the collection of air at the point 19, see Figure 16, where the paper pulp begins to wind onto the previously wound layers of the tube. It quite frequently happens that there is a small collection of air from time to time at this point and that this collection of air is carried into the body of the tube thus producing a void as indicated as 17 in Figure 15.

Referring to Figures 7 and 8 it will be seen that when the vacuum is produced in the impregnating tank that the air flows radially inwardly from the wall of the tube and consequently air is drawn from any void that may exist in the wound paper pulp tube. After this air has been exhausted from the void as well as from other portions of the wall of the tube, the vacuum is relieved and the flowing pitch entering the tube wall from one surface thereof exerts a pressure due to air pressure, or due to any additional pressure that may be added as heretofore described, and causes a collapse of the wound portion of the tube adjacent the void thus closing the void and causing all of the successive layers of the wound paper pulp tube to tightly bind against each other. The entering pitch also firmly cements and binds all of the layers of the tube together making a dense homogeneous mass or structure.

It will be seen that this invention provides a method and a resulting article in which a dense homogeneous structure is produced, in which the several successive layers constituting the body of the article are firmly and securely bound together by the waterproof, impregnating material and in which this impregnating material uniformly permeates all portions of the article.

In all cases, the tubes are removed from the impregnating vat and are allowed to dry and the pitch is allowed to harden.

While pitch has been described as the impregnating agent it is to be understood that any other suitable impregnating agent could be used provided it had the desirable characteristics suitable for this type of use.

It is also to be understood that although several specific forms of sealing materials have been described, that any other suitable size or sealing material and compounds therefrom can be employed. The sealing coating as described in detail hereinabove may be on either the inner or outer side of the tube or other article as is found most convenient and also this sealing coating can be applied to the one side of the completely dried article, or can be applied to successive final layers of the article during the time it is being wound on the wet machine.

It is to be understood that although a tube has been described in explaining the process, the invention is not limited to tubes. Obviously, the process is applicable to any type or shape of article.

The expression "paper pulp" appearing in the specification and claims is not intended as a limiting expression as it is obvious that this invention is applicable to any type of article and to the process of making such article, where the article is made from fibrous pulp or fibrous material whether it is strictly paper pulp or not.

It is also to be understood that where the expression "destroyed" is used in connection with the sealing coating that such expression is intended to cover either the actual destruction of the coating, causing it to disappear or causing the coating to become porous or otherwise causing the coating to lose its effectiveness as a sealing coating.

Although this invention has been described in considerable detail, it is to be understood that such description is intended as illustrative rather than limiting, as the invention may be variously embodied and is to be interpreted as claimed.

I claim:

1. The process of impregnating an article formed of compacted fibrous material, said process comprising forming a temporary impervious coating adjacent one surface of the article, said coating being characterized by the fact that at a predetermined temperature it is destroyed, subjecting the article to a non-absorbent, waterproof, binding material, reducing the pressure while the article is subjected to the binding material and maintaining the temperature of the binding material below that at which such coating is destroyed, thereafter raising the pressure while the article is still subjected to the action of the binding material and raising the temperature of the binding material to a point where it will destroy said coating.

2. The process of impregnating a tube of paper pulp comprising applying an impervious coating material to the entire surface of one wall of the tube, said coating material being characterized by the fact that it is destroyed at a predetermined rise in temperature, drying said tube, subjecting the tube to non-absorbent, waterproof, binding material, reducing the pressure while the tube is subjected to the binding material and maintaining the temperature of the binding material below that at which said coating is destroyed, and thereafter raising the pressure and increasing the temperature of the binding material above that at which said coating is destroyed.

RUDOLPH H. von LIEDTKE.

REFERENCES CITED

The following references are of record in the file of this patent:

UNITED STATES PATENTS

| Number | Name | Date |
|---|---|---|
| 684,604 | Dixon | Oct. 15, 1901 |
| 1,025,763 | Von Pintershofen | May 7, 1912 |
| 1,316,591 | Perry | Sept. 23, 1919 |
| 1,382,740 | Perry | June 28, 1921 |
| 2,134,427 | Biderman | Oct. 25, 1938 |